(12) United States Patent
Stump et al.

(10) Patent No.: US 8,796,883 B2
(45) Date of Patent: Aug. 5, 2014

(54) HYBRID POWER MANAGEMENT SYSTEM AND METHOD FOR UNMANNED REMOTE CELL SITES

(75) Inventors: Benjamin Stump, Kendall Park, NJ (US); Mathew Izzo, Little Silver, NJ (US); Joel M. Tamkin, Westerville, OH (US); Douglas Menifee, Columbus, OH (US); John Slemmer, Columbus, OH (US)

(73) Assignee: Westell, Inc., Aurora, IL (US)

( * ) Notice: Subject to any disclaimer, the term of this patent is extended or adjusted under 35 U.S.C. 154(b) by 515 days.

(21) Appl. No.: 13/078,055

(22) Filed: Apr. 1, 2011

(65) Prior Publication Data

US 2012/0025620 A1    Feb. 2, 2012

Related U.S. Application Data

(60) Provisional application No. 61/319,903, filed on Apr. 1, 2010.

(51) Int. Cl.
    *H02J 1/00*    (2006.01)
(52) U.S. Cl.
    USPC ............. 307/80; 307/43; 307/66; 455/572; 701/113; 320/132
(58) Field of Classification Search
    USPC ........ 307/80, 66, 43; 320/132, 116, 149, 150; 324/426, 430, 431, 433, 76.11; 455/572; 701/113, 112, 114, 115, 102, 701/103; 700/170, 180; 123/399, 361, 367, 123/462
    See application file for complete search history.

(56) References Cited

U.S. PATENT DOCUMENTS

| | | | | |
|---|---|---|---|---|
| 6,952,642 | B1 * | 10/2005 | Cowen | 701/113 |
| 7,218,078 | B2 * | 5/2007 | Gagnon et al. | 320/132 |
| 7,872,374 | B2 * | 1/2011 | Gottlieb et al. | 307/66 |
| 2003/0224833 | A1 * | 12/2003 | Egan et al. | 455/572 |
| 2009/0079263 | A1 * | 3/2009 | Crumm et al. | 307/43 |

* cited by examiner

*Primary Examiner* — Rexford Barnie
*Assistant Examiner* — Jagdeep Dhillon
(74) *Attorney, Agent, or Firm* — Porter, Wright, Morris & Arthur, LLP

(57) ABSTRACT

A method is disclosed for managing power at an unmanned remote cell site having at least one battery and at least one generator. The method includes the steps of determining whether there is a commercial power outage at the remote cell site and determining whether site temperature at the remote cell site and battery charge of the at least one battery at the remote cell site meet predetermined limits for battery discharging. Discharge of the at least one battery is automatically initiated to power the remote cell site if there is a commercial power outage and the site temperature and the battery charge both meet the predetermined limits for battery discharging. Operation of the at least one generator is automatically initiated to power the remote cell site if there is a commercial power outage and the site temperature and the battery charge do not both meet predetermined limits for battery discharging. Power load is transferred from the at least one generator to the at least one battery whenever the site temperature meets the predetermined limits and the battery charge is at full charge. Load is transferred back to commercial power when commercial power is restored.

24 Claims, 10 Drawing Sheets

| Event | Current Power Management State | Power Management Container Action | New Power Management Application States |
|---|---|---|---|
| Other Generator Failure | Any State | Generate Alarm | No State Change |
| Fuel_Refill_Event | Any State | Determine the next refuel date based upon consumption average and write measurement. Adjust calculation based upon fuel level difference between intervals plus average fuel consumption | No state change |
| Fuel Consumption Event | Any State | Generate an alarm and measurement | No State Change |
| Battery @ SOC (peak voltage) | Any State | No event generated based upon battery float voltage | No State Change |
| Generator runtime reached | Generator_Running | If site Temp. is normal, stop generator otherwise continue running generator to cool down the site | Stopping_Generator, Generator_Running |

FIG. 7A

| | | | |
|---|---|---|---|
| Fuel Consumption Event | Any State | Generate a Fuel_Consumption_alarm based upon Fuel Level readings in Comparison to Configured Consumption properties | No State Change |
| Commercial Power Restored | Generator_Running, Battery_Discharging | Stop Generator Update Battery Charge % | Stopping_Generator, Stop Generator |
| Fuel Theft event | Generator_Stopped | Generate a Fuel theft alarm | Generator_Stopped |
| Commercial Power Lost | Commercial_Power Restored | Start Generator (Transfer Load) | Starting_Generator |
| Battery @ EOD | Commercial_Power Restored | Update battery Charge % meas | Commercial_Power Restored, Battery_Charging |
| Battery @ SoC | Commercial_Power_Restored | Update Meas | Commercial_Power_Restored |
| Battery @ EOD | Commercial_Power_Lost, Battery_Discharging | Start Generator Update Meas | Starting_Generator |
| Battery @ EOD | Battery_Discharging, Start_Generator_Failure | Generate An Alarm/Event | Battery_Discharging |
| Generator Start Failure | Starting Generator | If # attempts = 3 then Generate Alarm & Exit OR go back to No_Utility_Feed | No_Utility_Feed |

FIG. 7B

| | | | |
|---|---|---|---|
| Commercial Power Restored | Starting - Generator | Stop the Generator (Need to set a threshold and alarm) Continue updating Battery Charge % | Stopping - Generator |
| Generator Started | Starting - Generator | Case: IF no Utility then Set state to Generator Running Else Wait For Stop Request to be processed | Generator_Running |
| Commercial Power Restored | Stopping - Generator | No action until Generator notifies PM Container that it has been Successfully Stopped - (need to add threshold around this) | Stopping - Generator |
| Generator Stopped | Stopping - Generator | Case: Battery has Load, Utility Restored Update State and init. genStop attempts to 0. | Battery_Discharging - OR Commercial_Power_Restored |

FIG. 7C

| Generator Stop Failure | Stopping_Generator | IF # attempts = 3 then<br><br>Generate Alarm & Exit OR Go Back, Else Reinitiate Stop attempt | Stopping_Generator,<br><br>Generator_Running<br>OR<br>No_Utility_Feed |

FIG. 7D

HYBRID POWER MANAGEMENT SYSTEM AND METHOD FOR UNMANNED REMOTE CELL SITES

CROSS-REFERENCE TO RELATED APPLICATIONS

This application claims the priority benefit of U.S. Provisional Patent Application No. 61/319,903 filed on Apr. 1, 2010, the disclosure of which is expressly incorporated herein in its entirety by reference.

STATEMENT REGARDING FEDERALLY SPONSORED RESEARCH

Not Applicable

PARTIES TO JOINT RESEARCH AGREEMENT

Not Applicable

REFERENCE TO APPENDIX

Not Applicable

FIELD OF THE INVENTION

The field of the invention generally relates to power management systems and methods at unmanned remote sites and, more specifically, relates to systems and methods used for load transfer at unmanned remote cell sites of wireless telecommunication networks.

BACKGROUND OF THE INVENTION

Wireless telecommunication networks typically have a plurality of unmanned remote cell sites. Due to the absence or scarceness of power grids in many of these locations, combinations of alternative power sources such as generators, batteries, solar, and wind must be utilized. When commercial power grids are available at the remote cell sites, these alternative power sources can be used to assume the load when commercial power is lost or unreliable. Accordingly, there is a need for power management systems and methods for transferring load between various power sources at unmanned remote cell sites.

SUMMARY OF THE INVENTION

Disclosed herein is a system and method for power management at unmanned remote sites addressing one or more issues in the related art. Disclosed is a method for managing power at an unmanned remote site having at least one battery and at least one generator. The method comprises the steps of determining whether there is a commercial power outage at the remote site and determining whether site temperature at the remote site and battery charge of the at least one battery at the remote site meet predetermined limits for battery discharging. Discharge of the at least one battery is initiated to power the remote site if there is a commercial power outage and the site temperature and the battery charge both meet the predetermined limits for battery discharging. Operation of the at least one generator is initiated to power the remote site if there is a commercial power outage and the site temperature and the battery charge do not both meet the predetermined limits for battery discharging.

Also disclosed is a system for managing power at an unmanned remote site having at least one battery and at least one generator. The system comprises a power management device having a processor and memory. The power management device is programmed to determine whether there is a commercial power outage at the remote site and to determine whether site temperature at the remote site and battery charge of the at least one battery at the remote site meet predetermined limits for battery discharging. The power management device is also programmed to initiate discharge of the at least one battery to power the remote site if there is a commercial power outage and the site temperature and the battery charge both meet the predetermined limits for battery discharging. The power management device is further programmed to initiate operation of the at least one generator to power the remote site if there is a commercial power outage and the site temperature and the battery charge do not both meet the predetermined limits for battery discharging.

From the foregoing disclosure and the following more detailed description of various preferred embodiments it will be apparent to those skilled in the art that the present invention provides a significant advance in the technology of power management systems for unmanned remote cell sites. Particularly, the invention(s) disclosed herein provides a reliable and low cost system and method which is easy to use and maintain. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIGS. 7A to 7D is a table showing states of a power management application of the hybrid power management system of FIGS. 1 and 2.

Figure 1:
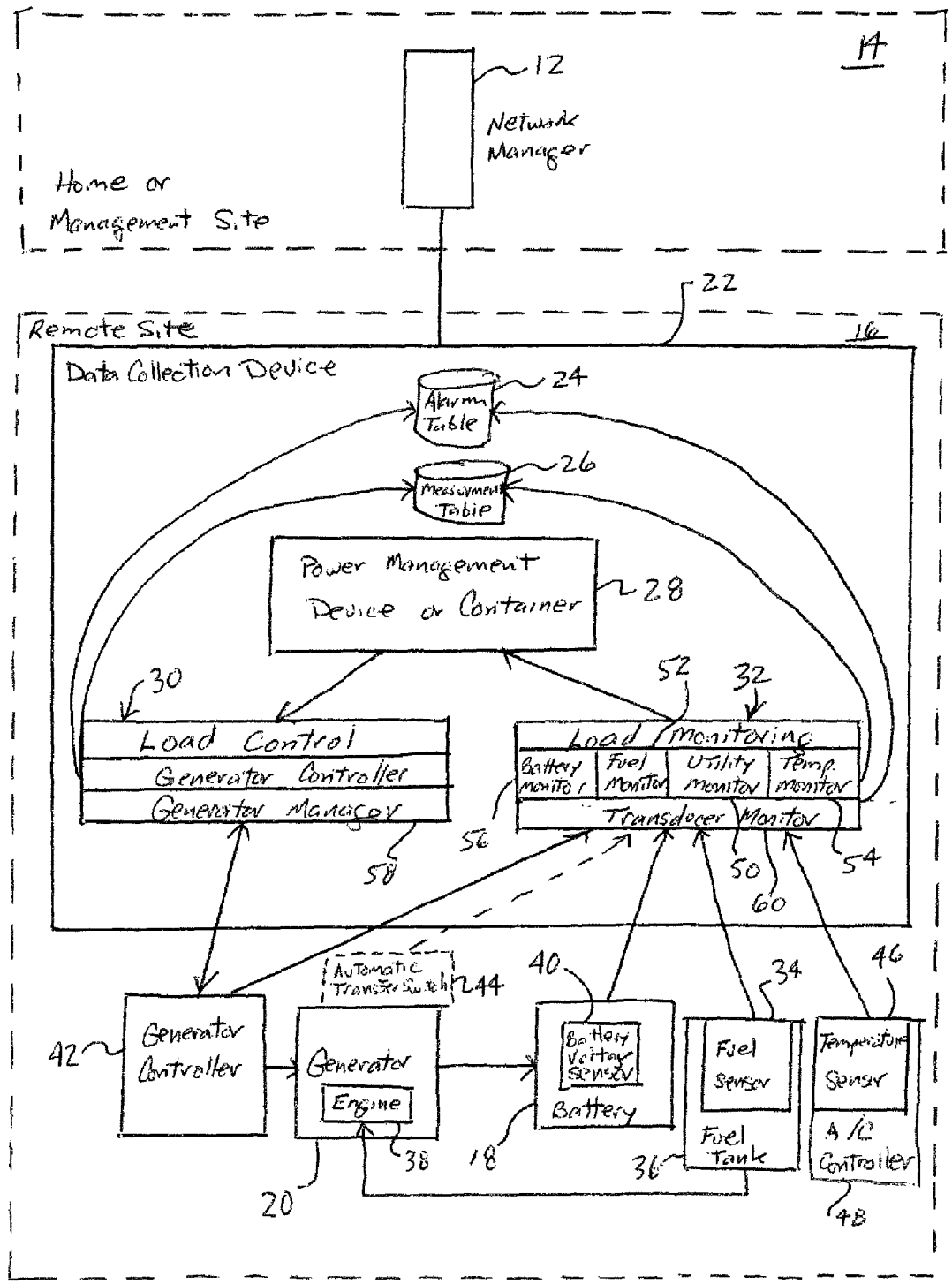
FIG. 1 is a diagrammatic view of a power management system according to the present invention.

It should be understood that the appended drawings are not necessarily to scale, presenting a somewhat simplified representation of various preferred features illustrative of the basic principles of the invention. The specific design features of the power management system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the power management systems illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved rescue launcher systems disclosed herein. The following detailed discussion of various alternative and preferred embodiments will illustrate the general principles of the invention with regard to power management of unmanned remote cell sites of wireless communication networks. Other embodiments suitable for other applications will be apparent to those skilled in the art given the benefit of this disclosure such as, for example, unmanned remote sites in other applications.

Figure 2:
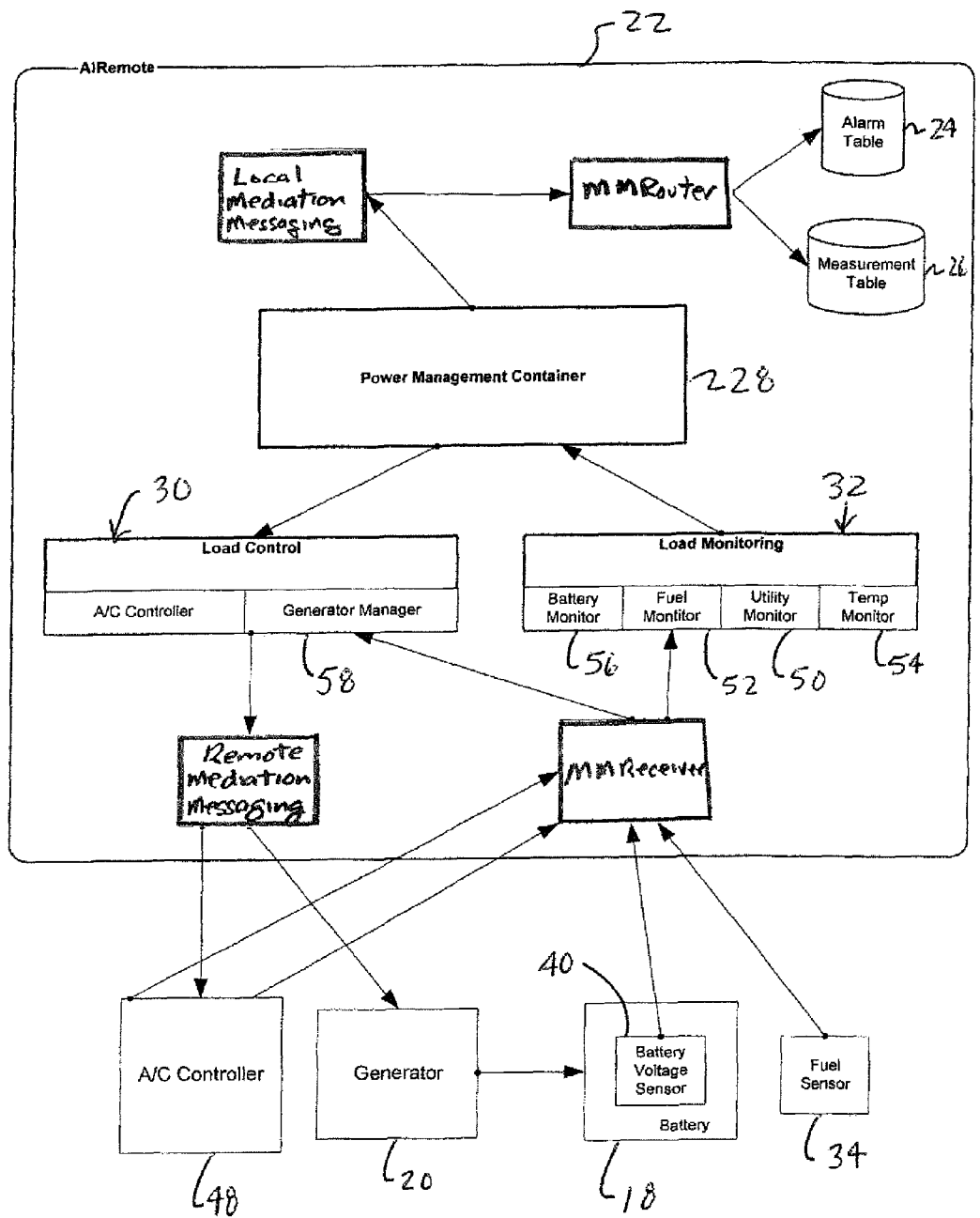
FIG. 2 is a block diagram of the components comprising the power management system of FIG. 1.

With reference to the drawing, FIGS. 1 and 2 illustrate a power management system for unmanned remote cell sites of wireless communication networks according to the present invention. The illustrated power management system 10 includes a network manager 12 located at a home or management site 14 and at least one unmanned remote cell site 16 having a tower, antenna and related equipment that require electrical power for operation. It is noted that while the illustrated power management system 10 shows a single remote cell site 16, in practice there will typically be a plurality of remote cell sites 16 located over a wide area. The illustrated remote cell site 16 is powered by commercial power but has both at least one backup electric battery 18 and at least one backup engine-powered electric generator 20 available to power the remote cell site 16 upon a commercial power outage. The term "commercial power outage" is used herein and in the claims to include situations when commercial power is lost, unreliable, and/or absent. It is noted that while a single battery 18 is shown, typically there is a string of batteries 18 and that while a single generator 20 is shown, there can be a string of generators 20.

The network manager 12 is located at the home site 14 and includes a computer system having a processor and memory configured to perform the management functions described herein. The computer system also includes suitable bi-directional communication means for communicating with the remote sites 16 via Ethernet, T1/E1, and/or wireless communication options. Management software with a suitable user interface is operable with the computer system. The management portal can be Optima® Management Portal available from Kentrox, Inc., of Dublin, Ohio, but it is noted that any other suitable management software can alternatively be utilized. The Optima® Management Portal is a hybrid network management/element management software package used to monitor and provide management access to Kentrox, Inc. products deployed in the user's network. The management software preferably gives network operators a complete, 360 degree view and control of the remote sites 16. The management software preferably provides preventative maintenance tools to help identify issues at the remote sites 16 before they occur. The management software also preferably provides performance reporting to enable operators to view trending and availability of the remote sites 16. Truck rolls to the remote sites 16 can be eliminated or reduced because of the remote access, diagnostics, and control capabilities in the management software. The main functions of the management software include: performance management; event management; element management; remote access; and site data collection and control. See U.S. pat. application Ser. No. 12/964,291, the disclosure of which is expressly incorporated herein in its entirety by reference, for a more detailed description of a suitable remote management portal.

The illustrated remote site 16 includes a data collection device 22 having an alarm table 24 and a measurement table 26 managed by the network manager 12 located at the home site 14. See U.S. pat. application Ser. No. 12/950,265, the disclosure of which is expressly incorporated herein in its entirety by reference, for a more detailed description of the alarm and measurement tables 24, 26. It is noted, however, that the remote site 16 can alternatively have any other suitable configuration managed by the network manager 12. The data collection device 22 supports different types of measurements fed from downstream sources or equipment at the remote site 16. The illustrated data collection device 22 includes a processor and memory configured to receive definitions of measurements and alarms to be collected at the remote site 16 and to store the definitions of the measurements and alarms, and measured information downstream collection devices that collect the measurements and alarms at the remote site 16, and a communication system for reporting the collected measurements and alarms to upstream systems such as the network manager 12. The definitions for the alarms and measurements can be provided from the collection devices, stored script processes, and SNMP proxy. The memory is preferably configured to automatically store a history of the measurements and alarms collected which can be exported to the upstream systems such as the network manager 12.

A power management container or device 28 manages overall application state based upon data provided by a load control component 30 and load monitoring component 32. Interfaces to the data collection device 22, which is the illustrated northbound management system, are via the local simple network manager protocol (SNMP) alarm and measurement tables 24, 26. It is noted that any other suitable northbound management system can alternatively be utilized.

When commercial power is available to the remote cell site 16, that is, there is not a commercial power outage at the remote cell site 16, power load of the remote cell site 16 is carried by the commercial power. The illustrated power management device 28 has a processor and memory and is programmed with a power management application to manage the power load at the remote cell site 16 with the backup battery 18 and/or the backup generator 20 upon a commercial power outage. Using the back-up battery 18 is preferred to using the back-up generator 20 because it saves energy. However, under some conditions it is preferred to utilize the backup generator 20 over the backup battery 18 such as, for example, conditions which reduce the life of the battery 18 and thus increase cost. The illustrated power management device 28 is programmed to determine whether there is a commercial power outage at the remote cell site 16 and to determine whether site temperature at the remote cell site 16 near the battery 18 and battery charge of the battery 18 at the remote cell site 16 meet predetermined limits for battery discharging. Operating the battery in conditions within the remote cell site that are too hot can damage and or reduce the life if the batteries. This is exacerbated by the fact that the remote site air conditioning unit is operated to cool the site temperature when the load is carried by commercial power or the generator 20 but the remote site air conditioning unit is not operated to cool the site temperature when the load is carried by the battery 18. The predetermined limit for the site temperature can be the recommended maximum temperature for operation of the battery 18 such as for example 80 degrees Fahrenheit but is preferably configurable so that the user can input any desired temperature depending on the amount of risk the user is will to take with regard to long term operation of the battery 18 in hot conditions. If the site temperature is at or greater than this predetermined limit, the load is not automatically transferred to the battery 18. Battery life is also affected by the number of times it is cycled. Thus you do not want to start using the battery 18 when it has a low charge level or state. The predetermined limit for the battery charge can be any suitable amount but is preferably configurable so that the user can input any desired minimum charge level depending on the amount of risk the user is will to take with regard to long term operation of the battery 18 due to excessive cycling. It is noted that battery charge can be measured in any suitable manner such as by percent of full voltage, time to full depletion or the like. For example, battery charge can be based upon a ratio of actual to configured float voltage or based on a regression estimation algorithm that provides an estimation of remaining discharge in minutes. If the battery charge is at or less than the predetermined limit, the load is not transferred to the battery 18. It is noted that the predetermined limit can alternatively be a maximum limit where the battery charge is measured by percent of depleted voltage, time from full charge, or the like.

The power management device 28 automatically initiates discharge of the battery 18 to power the remote cell site 16 if it is determined that there is a commercial power outage and the site temperature and battery charge both meet the predetermined limits for battery discharging. The power management automatically 28 initiates operation of the generator to power the remote cell site 16 if there is a commercial power outage and the site temperature and the battery charge do not both meet the predetermined limits for battery discharging. When the generator 20 is powering the remote cell site 16, the load is automatically transferred from the generator 20 to the battery 18 if the battery charge is at full charge and the site temperature meets the predetermined limit. For example, the site temperature may drop and/or the battery 18 may become fully charged. The load for the remote cell site 16 is automatically transferred back to commercial power when commercial power is restored.

Figure 3:
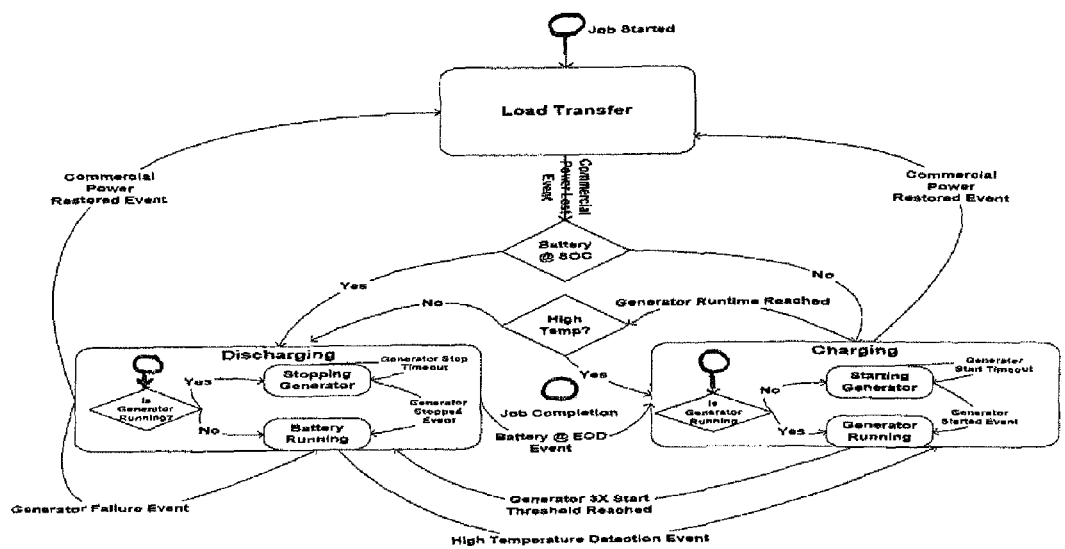
FIG. 3 is a diagrammatic view of states of a power management device of the power management system of FIGS. 1 and 2.

The illustrated power management device 28 is a state machine whose transitions are determined by events generated by the monitoring of commercial/utility power, site temperature, battery voltage, and fuel consumption. As best shown in FIG. 3, at any given time the power management application can be in one of the following states: (1) a load (power) transfer state; (2) a discharging state having sub-states of (2a) stopping generator state and (2b) battery running state; and (3) a charging state having sub-states of (3a) a starting generator state and (3b) a generator running state. As best shown in FIG. 3, the script spends the majority of its clock cycles handling events generated as a result of battery voltage, commercial power, room temperature, and fuel level monitoring. The script registers callback functions with each of the southbound components that handle threshold monitoring and event generation. Upon being notified of an event, the power management device 28 transitions to one of the three states: the load transfer state, the discharging state and the charging state.

The power management device 28 transitions to the load transfer state upon script activation and when commercial power is restored after a commercial power outage. In the load transfer state, the power management device 28 monitors generator fuel level, battery voltage, and commercial power feed. The illustrated power management system 10 includes a fuel lever sensor 34 of a fuel tank 36 associated with an engine 38 of the generator 20 that is in communication with the power management device 28 to provide a signal for indicating generator fuel level and a voltage sensor 40 of the battery 18 that is communication with the power management device to provide a signal for indicating battery voltage. The illustrated power management device 28 is also in communication with an intelligent controller 42 of the generator 20 to provide a signal indicating commercial power feed, that is, whether there is a commercial power outage or whether commercial power is online. The illustrated intelligent controller 42 is in communication with the power management device 28 through a serial RS485/RS232 interface but any other suitable interface can alternatively be utilized. Alternatively or additionally, the power management device 28 can be in communication with an automatic transfer switch dry contact alarm 44 associated with the generator 20 to obtain a signal indicating the state of commercial power. A loss of commercial power causes the power management device 28 to exit the load transfer state and enter into either the discharging state or the charging state based upon current battery voltage and site temperature. The illustrated power management system 10 includes a temperature sensor 46 that is in communication with the power management device 28 to provide a signal for indicating ambient or room temperature within the remote cell site 16 (the "site temperature"). The illustrated temperature sensor 46 is associated with an air conditioning controller 48 for the remote cell site 16 but any other suitable temperature measuring device can alternatively be utilized.

In the discharging state, the illustrated power management device 28 allows the load to failover to the battery 18. In the power management device 28 monitors battery voltage, site temperature, and commercial power feed. The script remains in the discharging state until commercial power is restored, site temperature exceeds the predetermined limit, or the battery 18 reaches end of discharge (EOD). If commercial power is restored, the power management device 28 enters the load transfer stage and the load is transferred to commercial power. If site temperature exceeds the predetermined limit or the battery 18 reaches EOD prior to transfer back to commercial power, the power management device 28 enters the charging state and the load is transferred to the generator 20.

In the charging state, the illustrated power management device 28 allows the load to failover to the generator 20 for a predetermined duration suitable for fully charging the battery 18. If the site battery 18 previously discharged to a voltage level less than or equal to a configured "depth of discharge" voltage, then the generator 20 is started and continues to run for the product of the duration of prior discharge and a recharge multiplier. In the illustrated embodiment the recharge multiplier is configurable, but defaults to 1.5. For example, if the site battery 18 previously discharged for a period of 30 minutes, then the generator 20 is started and continues to run for 45 minutes (1.5×30 minutes). If the site battery 18 previously discharged down to its configured depth of discharge voltage, then the generator 20 is run for the configured battery capacity duration multiplied by the recharge multiplier. At generator runtime completion which indicates the battery 18 is fully charged, the power management device 28 checks the site temperature and if the site temperature is below the predetermined limit, the power management device 28 enters the discharging state and the load is transferred to the battery 18, or if commercial power is restored, the power management device 28 enters the load transfer state and the load is transferred to commercial power.

As best shown in FIGS. 7A to 7D, in addition to monitoring system activity, the illustrated power management device 28 and its sub-components forward real-time alarms or events to the northbound management systems. In addition to publishing real-time events to the alarm table 24 of the local data collection device 22, the illustrated power management device 28 handles events generated by the following modules:

a utility monitor 50; a fuel monitor 52; a temperature monitor 54; a battery monitor 56; and a generator manager 58. In the illustrated embodiment, the following information is forwarded: the generator fuel efficiency (in run hours per fuel unit); commercial power runtime; battery charge %; daily fuel efficiency (calculated daily@ user defined time—or default of midnight); fuel consumption; room temperature; battery voltage; generator voltage; mains current; mains voltage; time until generator maintenance; fuel refill minutes/hours; battery S.O.C %; average battery runtime; and number of generator working hours. It is noted that alternatively less than all of this information can be forwarded and/or any other suitable information can additionally be forwarded. The following list denotes a subset of the alarms that are preferably provided: commercial power lost/restored; generator started/stopped; battery discharging/recharging; fuel theft; high site temperature; abnormal fuel consumption; fuel cap opened/closed; client remote access; time remaining until maintenance; and fuel refilling. It is noted that alternatively less than all of these alarms can be forwarded and/or any other suitable alarms can additionally be provided.

The illustrated power management device 28 monitors events from managed resources and take actions to ensure that site load is efficiently transferred during commercial power outages. To accomplish this, the power management device 28 subscribes to events raised by the utility monitor 50, the fuel monitor 52, the temperature monitor 54, the battery monitor 56, and the generator manager 58.

Figure 4:
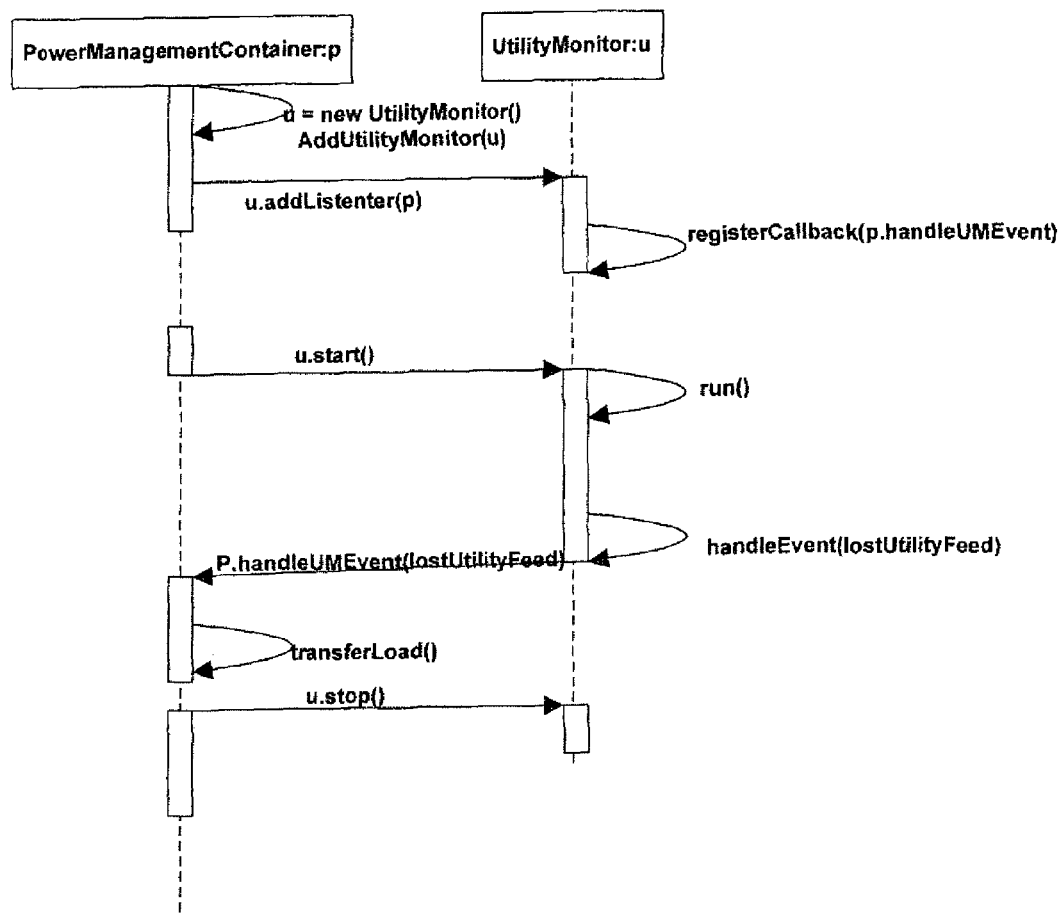
FIG. 4 is a diagrammatic view of sequences of a utility monitor of the power management system of FIGS. 1 and 2.

The utility monitor 50 continuously checks the discrete input associated with the commercial power feed. The illustrated utility monitor 50 is only enabled in the event that mains or commercial power feedback isn't provided by the intelligent generator controller 42. This notification can alternatively or additionally be provided by a discrete connection being physically wired from the automatic transfer switch (ATS) 44 to the power management device 28. Upon instantiation, the utility monitor accepts a discrete input point as a property. The utility monitor 50 continuously polls for commercial power status input point status (open/closed). In the event that commercial power is non-existent or has been lost, the utility monitor 50 generates an event and notifies the power management device 28 that its state has changed. Likewise, the utility monitor 50 sends notification once power has been restored. FIG. 4 illustrates an exemplary utility monitor 50 sequence in an event where commercial power is lost.

Figure 5:
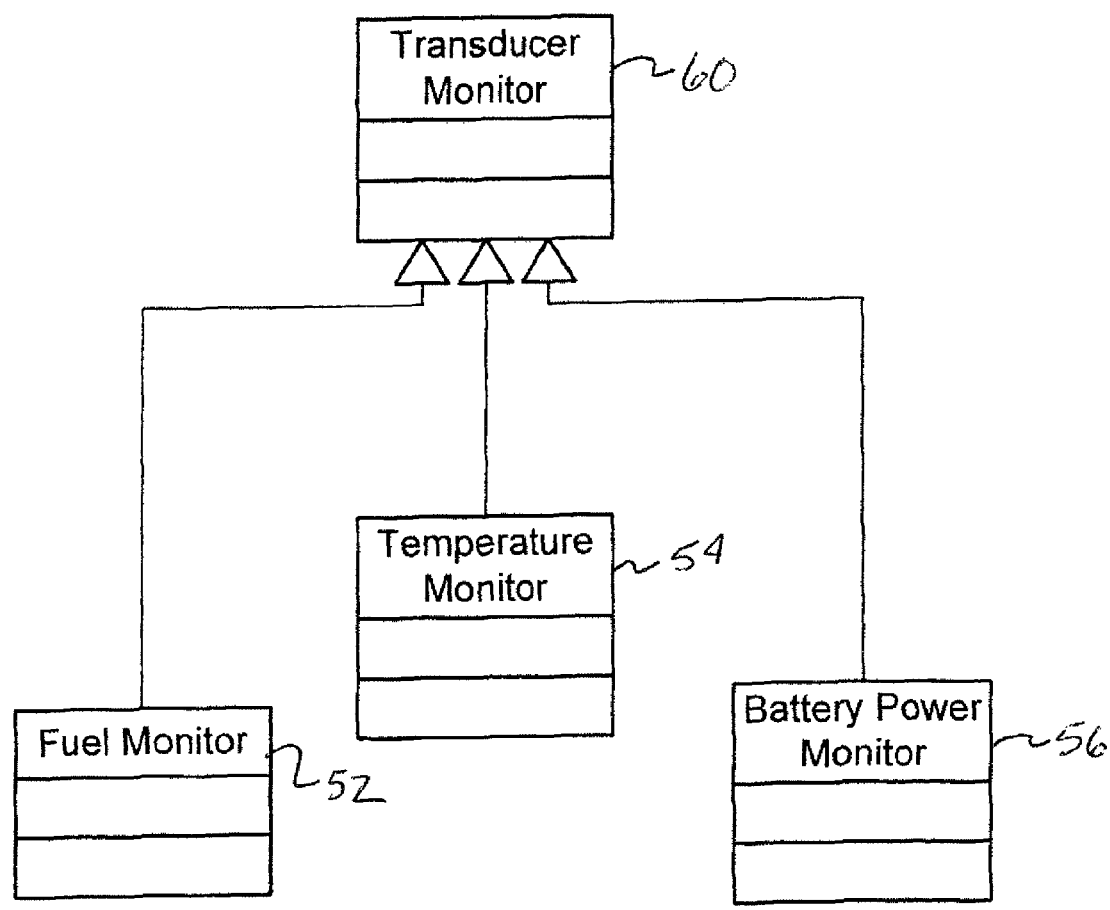
FIG. 5 is a diagrammatic view of transducer class inheritance of the power management system of FIGS. 1 and 2.

As best shown in FIG. 5, a transducer monitor 60 is preferably the base class for the power management application monitoring of fuel, temperature, and battery. It defines the core behavior and acts as a base class for all instantiated transducers/sensors (i.e. fuel, temperature). Given low, in-band, high, and very high thresholds, the transducer monitor 60 keeps the power management device 28 aware of events. The class preferably provides methods to allow the power management device 28 to subscribe to one or more of events associated with the following thresholds: very low; low; in-band (normal); high; and very high. Subscribers that register callbacks receive notification in the form of event identifiers along with any relevant data.

The fuel monitor 52 extends the transducer monitor 60 and notifies subscribers of events specific to fuel monitoring. The measurement table 26 maintains a fuel consumption history and moving average based upon data fed to it periodically by the fuel monitor 52. For a suitable measurements table, see U.S. Patent Application No. 61/262,575, the disclosure of which is expressly incorporated herein in its entirety by reference. Based upon this data, the fuel monitor 52 makes subscribers aware of potential fuel-level anomalies such as theft or abnormal consumption. This determination is made by comparing fuel level readings to what has been determined to be normal consumption. A relatively small overage would show inefficiencies in operation while a relatively large overage would indicate a leak or theft. The power management device 28 is preferably programmed to provide remote access to the intelligent controller 42 of the generator 20 for troubleshooting the generator 20 to resolve any reported inefficiencies. The fuel monitor 52 also detects scenarios where fuel has been refilled (detected by an increase in fuel level) and adjusts its internal consumption window accordingly.

The temperature monitor 54 extends the transducer monitor 60 so that subscribers such as power management applications are made aware of events specific to room temperature changes. The measurement table 26 is the destination of real-time temperature values. High temperature events spur an application transition from the discharging to the charging state. A transition from the charging to discharging state will not occur unless the room temperature is in-band.

The battery voltage monitor 56 extends the transducer monitor 60 and allows subscribers to be notified of changing battery voltage states. When commercial power is lost, a comparison is made between the current battery voltage and the configured state of charge (SOC) value to determine whether the power management application needs to transition from the load transfer state to either the charging or discharging state. The battery monitor 56 continuously polls a configured analog input point for readings and updates its voltage in the measurement table 26.

While the power management device 28 spends the majority of its cycles monitoring the various sensors 34, 40, 46, for new analog/discrete values, its load control functionality allows it to facilitate load transfer through the enabling/disabling of the generator 20. The generator manager 58 defines the interface detailing the logic necessary to start, stop and, as a whole, interface to the generator 20. This abstraction allows the generator manager 58 to be a handler of other objects that adhere to a basic generator interface. For example, a developer should be able to plug-in generator and generator controller logic/modules as long as those modules adhere to the defined interface. This concept of having a generator management base class is useful in scenarios where a customer has a hybrid power management environment consisting of multiple generators or those supporting a non-standard communications protocol.

Figure 6:
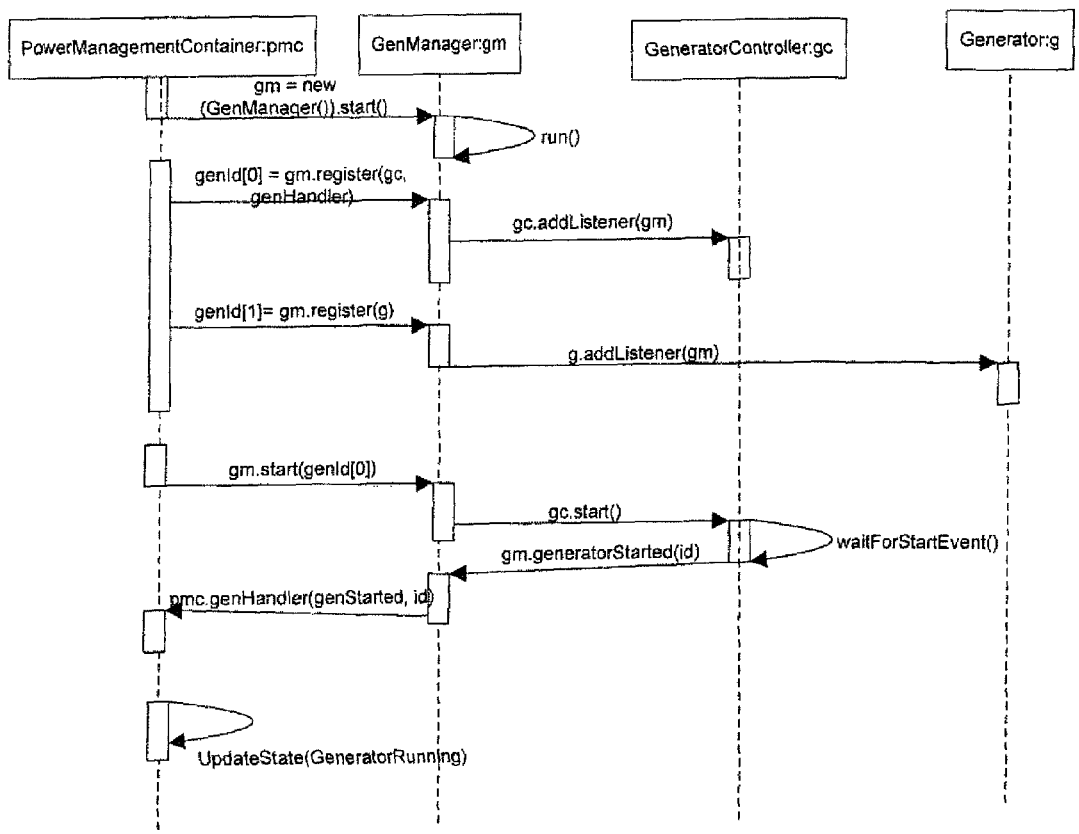
FIG. 6 is a diagrammatic view of an exemplary sequence of a generator manager of the hybrid power management system of FIGS. 1 and 2.

The generator manager 58 provides an interface so that subscribers (i.e. power management applications) are notified of successful generator start attempts and failures. The generator manager 58 accomplishes this through its interface to an interface of the generator controller 42 or a relay output. At startup, the generator manager 58 is pre-configured with the following properties: generator run time; generator start back-off duration; generator stop back-off duration; generator max start attempts; generator max stop attempts; generator start threshold; and generator stop threshold. FIG. 6 shows an exemplary sequence of the generator manager 58.

When requested to start the generator 20, the generator manager 58 invokes the appropriate startup logic regardless of whether startup is achieved by issuing an industry-standard Modbus command over a serial connection to the generator controller 42 or by energizing a Kentrox Data Collection Device relay output or the like to accomplish the same task. If startup confirmation isn't received within Generator Start Threshold minutes, the generator manager 58 reinitiates the startup sequence up to Generator Max Start Attempts. After the start count has been exhausted, the power management device 28 generates a Generator Stop Failure alarm, backs off for a predetermined duration and reinitiates the generator startup procedure. Similarly, if the generator manager 58 can't stop the generator 20 after Generator Stop Threshold Attempts, it backs off for a predetermined duration and reinitiates the generator shutdown procedure.

From the foregoing disclosure it is apparent that in addition to efficient and automatic load transfer to save energy and cost, the power management system of the present invention also: (1) provides near real-time fuel, battery, generator and temperature statistics (this includes the detection of events indicative of negative/positive fuel consumption); (2) controls enabling/disabling of generators through the monitoring of a commercial power voltage and battery voltage levels; and (3) creates an access path (port) so that an element management system user can gain remote access to managed device consoles.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method for managing power at an unmanned remote site having at least one battery and at least one generator, said method comprising the steps of:
    determining whether site temperature at the remote site meets a predetermined upper limit for initiating battery discharging;
    determining whether battery charge of the at least one battery at the remote site meets a predetermined lower limit for initiating battery discharging;
    initiating discharge of the at least one battery to power the remote site if commercial power is unavailable at the remote site, the site temperature is below the predetermined upper limit for initiating battery discharging, and the battery charge is above the predetermined lower limit for initiating battery discharging;
    initiating operation of the at least one generator to power the remote site if commercial power is unavailable at the remote site and at least one of the site temperature is not below the predetermined upper limit for battery discharging and the battery charge is not above the predetermined lower limit for initiating battery discharging;
    transferring load from the at least one generator to the at least one battery to power the remote site if the at least one generator is operating, the site temperature is below the predetermined upper limit, and the battery charge is at full charge; and
    transferring load to commercial power if commercial power becomes available at the remote site when one of the at least one battery and the at least one generator is powering the remote site.

2. The method as set forth in claim 1, further comprising the steps of determining whether the at least one generator is consuming fuel beyond a predetermined consumption rate when the at least one generator is operating, and transferring load from the at least one generator to the at least one battery if the at least one generator is operating to power the remote site, the fuel consumption of the at least one generator is above the predetermined consumption rate, the site temperature is below the predetermined upper limit, and the battery charge is at full charge.

3. The method as set forth in claim 1, further comprising the step of monitoring a fuel level of a fuel tank of the at least one generator to determine whether fuel theft has occurred from the fuel tank.

4. The method as set forth in claim 1, further comprising the step of monitoring a fuel level of a fuel tank of the at least one generator to determine whether the fuel tank has been refueled.

5. The method as set forth in claim 1, further comprising the step of providing remote access to an intelligent controller of the at least one generator for troubleshooting the at least one generator.

6. The method as set forth in claim 1, further comprising the step of determining the battery charge based upon a ratio of actual to configured float voltage.

7. The method as set forth in claim 1, further comprising the step of determining battery charge using a regression estimation algorithm and providing an estimation of remaining discharge in minutes.

8. The method as set forth in claim 1, further comprising the step of monitoring time until maintenance for the at least one generator, fuel level for the at least one generator, fuel consumption for the at least one generator and generating alarms when predetermined thresholds have been exceeded.

9. The method as set forth in claim 1, further comprising the step of monitoring commercial power, battery voltage, site temperature, and generator runtime and generating alarms when predetermined thresholds have been exceeded.

10. The method as set forth in claim 1, further comprising the step of determining whether there is a commercial power outage by monitoring an intelligent controller of the at least one generator through a serial RS485/RS232 interface.

11. The method as set forth in claim 1, further comprising the step of determining whether there is a commercial power outage by monitoring an automatic transfer switch dry contact alarm.

12. The method as set forth in claim 1, further comprising the step of operating an air conditioning unit at the remote site to cool the site temperature when needed if the remote site is powered by operation of the at least one generator or commercial power but not if the remote site is powered by operation of the at least one battery.

13. A system for managing power at an unmanned remote site having at least one battery and at least one generator, said system comprising:
    a power management device having a processor and memory;
    wherein the power management device is programmed to determine whether site temperature at the remote site meets a predetermined upper limit for initiating battery discharging;
    wherein the power management device is programmed to determine whether battery charge of the at least one battery at the remote site meets a predetermined lower limit for initiating battery discharging;
    wherein the power management device is programmed to initiate discharge of the at least one battery to power the remote site if commercial power is unavailable at the remote site, the site temperature is below the predetermined upper limit for initiating battery discharging, and the battery charge is above the predetermined lower limit for initiating battery discharging;

wherein the power management device is programmed to initiate operation of the at least one generator to power the remote site if commercial power is unavailable at the remote site and at least one of the site temperature is not below the predetermined upper limit for battery discharging and the battery charge is not above the predetermined lower limit for initiating battery discharging;

wherein the power management device is programmed to initiate load transfer from the at least one generator to the at least one battery to power the remote site if the at least one generator is operating, the site temperature is below the predetermined upper limit, and the battery charge is at full charge; and wherein the power management device is programmed to permit load transfer to commercial power if commercial power becomes available at the remote site when one of the at least one battery and the at least one generator is powering the remote site.

14. The system as set forth in claim 13, wherein the power management device is programmed to determine whether the at least one generator is consuming fuel beyond a predetermined consumption rate when the at least one generator is operating and to transfer load from the at least one generator to the at least one battery if the at least one generator is operating to power the remote site, the fuel consumption of the at least one generator is above the predetermined consumption rate, the site temperature is below the predetermined upper limit, and the battery charge is at full charge.

15. The system as set forth in claim 13, wherein the power management device is programmed to monitor a fuel level of a fuel tank of the at least one generator to determine whether fuel theft has occurred from the fuel tank.

16. The system as set forth in claim 13, wherein the power management device is programmed to monitor a fuel level of a fuel tank of the at least one generator to determine whether the fuel tank has been refueled.

17. A system as set forth in claim 13, wherein the power management device is programmed to provide remote access to an intelligent controller of the at least one generator for troubleshooting the at least one generator.

18. A system as set forth in claim 13, wherein the power management device is programmed to determine the battery charge based upon a ratio of actual to configured float voltage.

19. A system as set forth in claim 13, wherein the power management device is programmed to determine the battery charge using a regression estimation algorithm and providing an estimation of remaining discharge in minutes.

20. A system as set forth in claim 13, wherein the power management device is programmed to monitor time until maintenance for the at least one generator, fuel level for the at least one generator, fuel consumption for the at least one generator and to generate alarms when predetermined thresholds have been exceeded.

21. A system as set forth in claim 13, wherein the power management device is programmed to monitor commercial power, battery voltage, site temperature, and generator runtime and to generate alarms when predetermined thresholds have been exceeded.

22. A system as set forth in claim 13, wherein the power management device is programmed to determine whether there is a commercial power outage by monitoring an intelligent controller of the at least one generator through a serial RS485/RS232 interface.

23. A system as set forth in claim 13, wherein the power management device is programmed to determine whether there is a commercial power outage by monitoring an automatic transfer switch dry contact alarm.

24. A system as set forth in claim 13, wherein the power management device is programmed to permit operation of an air conditioning unit at the remote site to cool the site temperature when needed if the remote site is powered by operation of the at least one generator or commmercial power but not if the remote site is powered by operation of the at least one battery.

* * * * *